March 2, 1954     H. DANNENBERG     2,671,053
METHOD AND APPARATUS FOR HIGH VACUUM DISTILLATION
Filed June 20, 1947     3 Sheets-Sheet 1

Inventor:
Hans Dannenberg
By *Oswald W. Milmore*
His Attorney

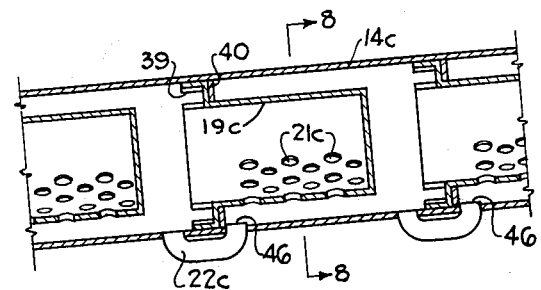
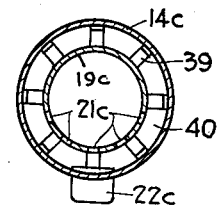
Fig. 5  Fig. 8
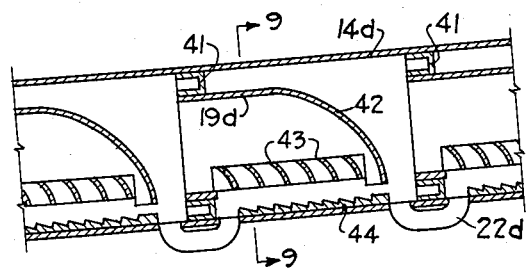
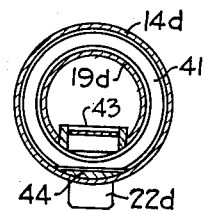
Fig. 6  Fig. 9
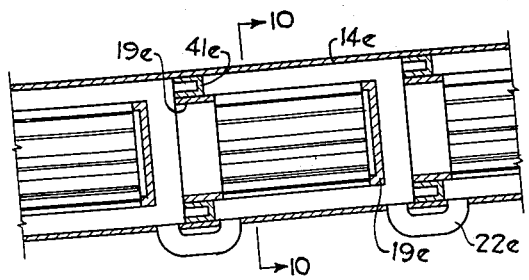
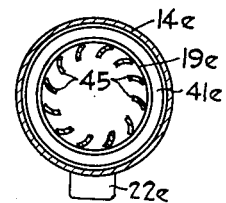
Fig. 7  Fig. 10
Inventor:
Hans Dannenberg
By Oswald H. Milmore
His Attorney

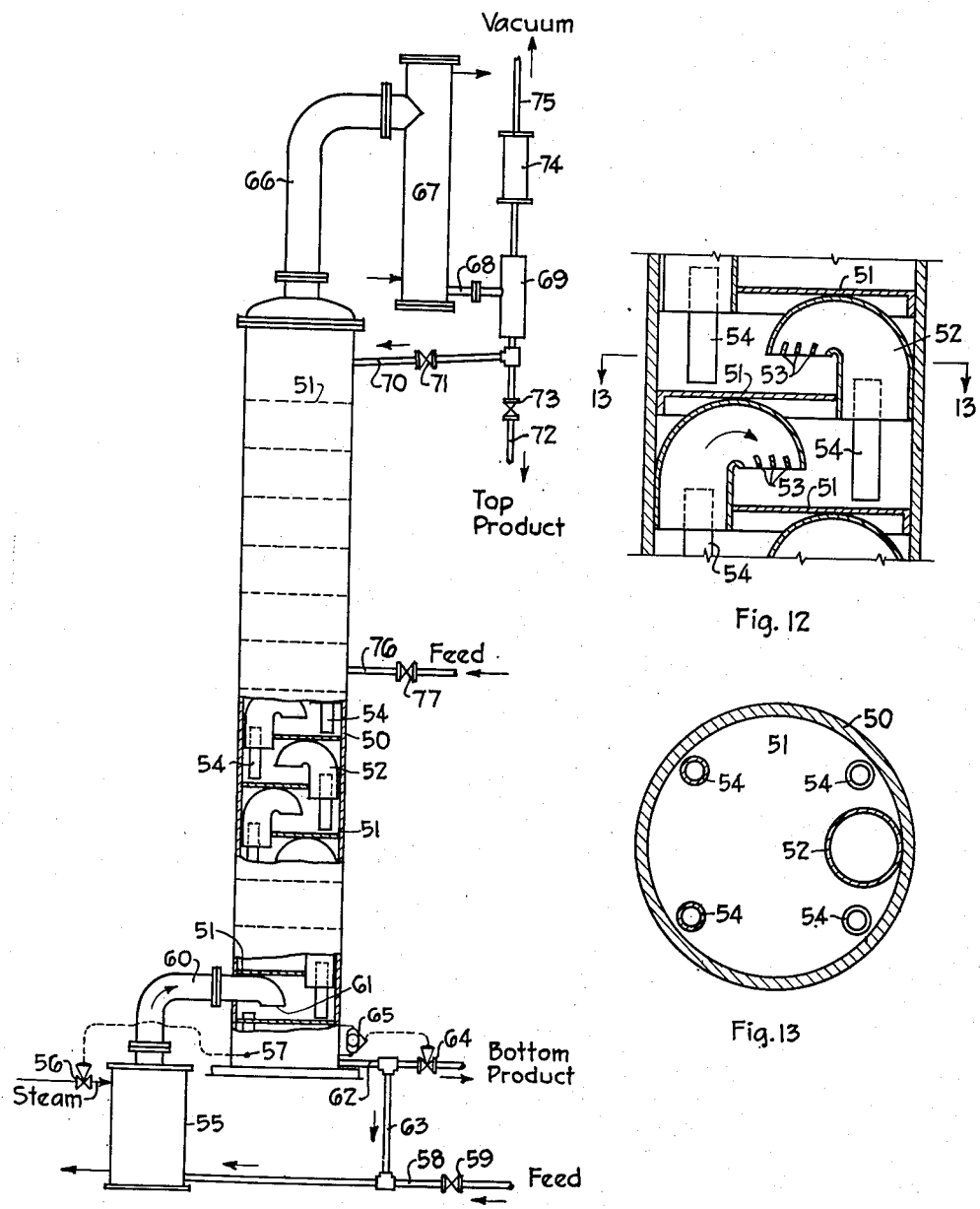

Patented Mar. 2, 1954

2,671,053

UNITED STATES PATENT OFFICE 2,671,053

METHOD AND APPARATUS FOR HIGH VACUUM DISTILLATION

Hans Dannenberg, Berkeley, Calif., assignor to Shell Development Company, San Francisco, Calif., a corporation of Delaware Application June 20, 1947, Serial No. 755,998

10 Claims. (Cl. 202—40)

This invention relates to the separation of a mixture of liquid by fractional distillation at high vacuum. The application of high vacuum in distillation is often necessary because the substances are not sufficiently volatile to obtain quantitative vaporization at higher pressures, or because they decompose or form other reaction products at the temperature necessary to vaporize them at higher pressures. Another reason for using high vacuum is that the liquid vapor equilibrium curves of the substances to be separated are often so close together at ordinary pressures or at moderately low pressures that an excessively large number of stages is required to effect their separation; operating at a high vacuum often improves the relation between these equilibrium curves and facilitates the fractional distillation of mixtures having relatively close boiling points at atmospheric pressures. The latter phenomenon is illustrated by Bogart et al., U. S. Patent No. 2,311,180.

The technique for fractional distillation under moderately high vacuum, i. e., at pressures reduced to about 5 or 10 mm. of Hg is well advanced in the art. However, when such operations are carried out in a bubble column or packed tower or the like, there is a pressure drop across the length of the column, the magnitude of this drop depending upon the size and design of the equipment and the rate of distillation. The result is that further lowering of the pressure at the top of the column will effect no further lowering of the pressure in the portion of the column near the kettle.

Distillations have also been effected at very low pressures employing molecular distillation. Such stills are not well adapted for fractional distillation, i. e., to operations wherein the vapors and the liquids are flowed countercurrently through a plurality of stages to attain progressive enrichment of the streams in the components to be separated. A proposal for countercurrent molecular distillation is described by Brewer and Madorsky in Journal of Research of the U. S. Bureau of Standards, vol. 38, pps. 129–135, January, 1947. Fractional distillation capable of handling larger flows and carried out in simpler apparatus is, however, necessary for separating many liquid mixtures met in industry.

It is a principal object of the present invention to provide an improved method and apparatus for effecting the separation of a mixture by fractional distillation at high vacuum, which will permit the attainment of pressures below about 10 mm. of Hg at all points in the system.

Another object of the invention is to provide an improved method of separating by fractional high vacuum distillation a mixture of materials having relatively close boiling points at atmospheric pressure into two desired end products by reducing the pressure difference or pressure drop between the ends of the distillation column. Ancillary thereto, it is an object to provide an improved fractional distillation column wherein the pressure drop between the ends of the column is less than in the columns heretofore used for this purpose.

Still another object is to provide an improved method and apparatus for separating mixtures by high vacuum fractional distillation wherein mass transfer between the vapor and gas, tending toward equilibrium, is attained by utilizing the kinetic energy of the gas by directing it against a pool of liquid to agitate the latter, the liquid being flowed through a series of pools and the vapor being flowed through a series of orifices or nozzles disposed to bring about the desired agitation.

Further objects and advantages of the invention will become apparent from the following description of certain preferred embodiments thereof taken in connection with the drawing forming a part of this specification, wherein:

Figs. 5, 6 and 7 are vertical longitudinal sectional views of three alternate forms, each representing a short length of the composite column;

Figure 1:
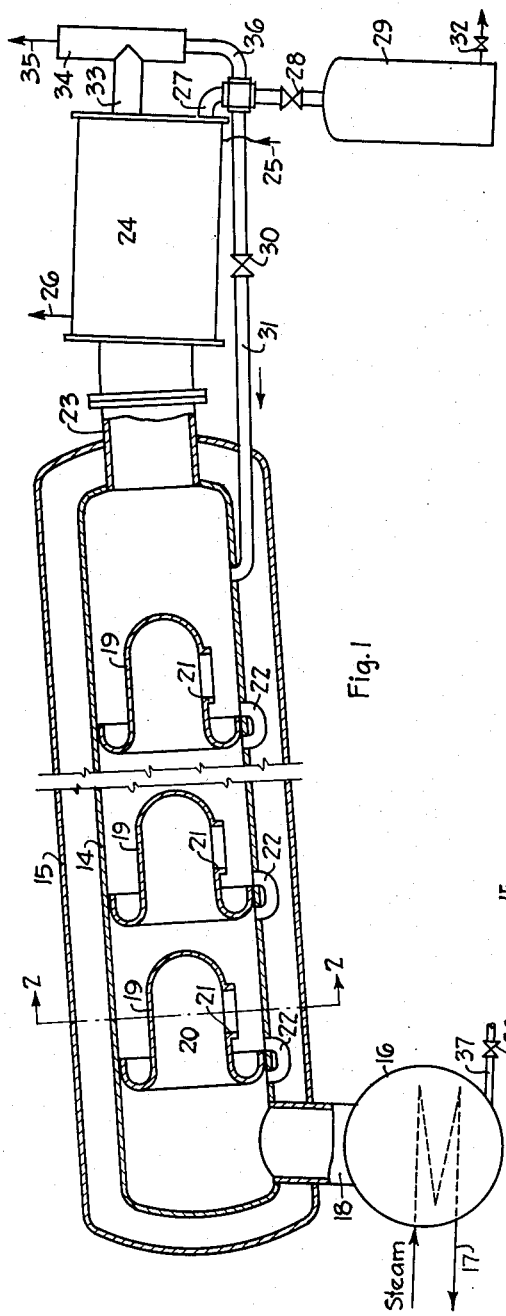
Fig. 1 is a vertical longitudinal sectional view of a horizontal column according to the invention.

Figs. 8, 9 and 10 are cross-sectional views taken on lines 8—8, 9—9 and 10—10 of Figs. 5, 6 and 7, respectively;

Fig. 11 is a vertical cross-sectional view of a vertical column according to the invention;

Fig. 12 is an enlarged fragmentary vertical cross-sectional view of a portion of the column shown in Fig. 11; and Fig. 13 is a cross-sectional view taken on line 13—13 of Fig. 12.

An analysis of the shortcomings of conventional types of distillation columns showed that there are good reasons for the inadequate performance of these columns at low pressure, and that the following important factors cause excessive pressure drop through the column:

1. Liquid head. In conventional fractional distillation equipment the vapor bubbles through successive pools of liquid. The pressure at the surface of each pool is lower than at the level at which the vapors are fed into the pool, and each plate adds to the gas pressure in the system. This effect is cumulative, and the total effect of the series of pools is to create an undesirably high pressure at the kettle end of the column.

2. Vapor head. The vapors within the column have a finite weight, and the weight of the column of vapor within the distillation column results in a greater pressure at the bottom than at the top of the column. This effect is particularly significant in packed columns.

3. Vapor friction. In passing through each pool of liquid the vapors are obstructed and there is a pressure drop at each passage. The summation of these pressure drops throughout the column is considerable and creates an appreciably higher pressure at the bottom than at the top of the column. Such friction is particularly pronounced in packed columns where there are no pools but the vapors are subjected to friction because of the restricted passages and large contact surface involved.

The present invention seeks to obviate or minimize some or all of these causes of excessive pressure drop. Instead of causing a penetration of the pool of liquid, as in the bubble column, or passage through narrow passages causing friction over extended surfaces, as in the packed column, the kinetic energy of the vapor is utilized to create large liquid surfaces. More specifically, vapor at high velocity is impinged upon a liquid surface to agitate it, i. e., to spread it out or whirl it around, in order to effect the necessary intimate contact between the vapor and liquid phases. Some vapor friction is involved in flowing the vapor through somewhat restricted channels to attain the agitation; however, it was found that this friction is considerably less than that involved in conventional columns.

The improved method according to this invention, therefore, comprises flowing the liquid through a series of pools and flowing the vapor countercurrently to the liquid while impinging it against the successive pools to agitate the pools for effecting mass transfer without causing the vapor to traverse the liquid pools. In one embodiment of the invention the liquid pools are arranged so as to result in a minimum elevational difference between the first and last pools, whereby the liquid head and the vapor head are reduced to a minimum; the liquid is transferred between pools by gravity flow through siphon connections. This involves the use of a substantially horizontal column. According to another embodiment a vertical column is used and the pools are spaced vertically to a greater extent, whereby some of the advantages, viz, reduction of the vapor head to a minimum, are sacrificed for the sake of conserving ground space; however, the column is arranged to minimize the liquid head, as will be explained hereinafter. It should be noted that the vapors are brought into contact with liquid without substantial condensation, and that my method is not, therefore, a molecular distillation method.

Figure 2:
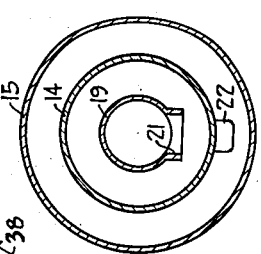
Fig. 2 is a cross-sectional view taken on line 2—2 of Fig. 1.

Referring to Figs. 1 and 2 of the drawing, 14 is a tubular column, inclined at about 5° to 10° to the horizontal and provided with an outer jacket 15 providing a space surrounding the column which space may be filled with heat-insulating material, not shown, or which may be evacuated, or through which a temperature-regulating fluid may be passed. A kettle or reboiler 16 is supplied with heat by heating coil 17 and connected to the lower end of the column by a wide conduit 18 which permits the flow of vapor with a minimum of vapor friction. The column and jacket are constructed of several parts, depending upon the size of the installation, to permit assembly and insertion of the stage separators, described hereinafter; inasmuch as such engineering details form no part of the invention, it is not thought necessary to show them in detail.

The column is subdivided into stages by means of thimbles 19, of which any number, e. g., 12 or more may be provided, depending on the number of stages desired. Each thimble is sealed to the walls of the column and forms a depression or basin to the right of its juncture with the column 14 in which a pool of liquid can collect. The thimbles have tubular portions disposed concentrically with the column 14 providing smaller tubular passages 20 extending upstream, i. e., toward the upper end of the column. The passages 20 are of ample cross-section to offer a minimum of resistance to the flow of vapors. An orifice 21 with cylindrical side walls is formed in the lower wall of each thimble. The orifices are of slightly restricted diameter and positioned to direct a current of vapor downwardly against the lower wall of the column 14. A siphon tube 22 is provided for each thimble to permit liquid reflux to pass from stage to stage by gravity flow.

A large-diameter conduit 23 at the upper end of the column connects the vapor space of the uppermost stage to a condenser 24 which may be cooled by means of water, brine, or other cooling fluid fed through lines 25 and 26. Condensate is withdrawn through pipe 27 and withdrawn via valve 28 to storage 29. Reflux, at a rate controlled by valve 30, is returned to the column via reflux line 31. Valve 32 controls the top product draw-off line. The condenser is further connected by means of conduit 33 to a liquid separator 34 and to a source of vacuum, indicated at 35. It is understood that high vacuum may be provided at 35 by any known means which may, if desired, comprise auxiliary condensers, cold traps, a high vacuum manometer, and a vacuum pump, such as a rotating oil pump. These accessories are known per se and are, therefore, not shown in the drawing. Liquid separated in the separator 34 is returned to the condensate line via line 36.

In the operation of the column, the charge may be fed into the kettle through inlet 37 and valve 38. A high vacuum pump, for example, one producing an absolute pressure of between 0.001 mm. of Hg and 5 mm. of Hg, is applied at 35, and heating fluid is introduced through the coil 17 to vaporize the charge. The valve 28 is initially closed. After the column has become filled with the vapors and the condensate flows through the reflux line 31; a shallow pool or reflux liquid collects in each stage to the right of each partition and beneath each orifice 21, flowing from stage to stage through the siphon tubes 22. At the very low pressures prevailing under the conditions under which this column is operated, the vapor has a high specific volume and moves with high velocity through the orifices 21. The vapor, therefore, agitates the liquid pools and brings about intimate contact, tending toward establishment of equilibrium in each stage between the composition of the vapor and the compositions of the liquid in the pool. In the embodiment shown in Figs. 1 and 2 the vapor stream forms a depression in the liquid level in the area immediately beneath the orifice and a portion of the wall of the column is often free from liquid or covered only with a thin film of liquid.

The shallow pools preferably extend only a short distance from the bottom of the tube 14 to the lower end of the orifice 21, usually from one-tenth to one-half of this distance. The level must never reach the lower end of the orifice 21 because the liquid must not be traversed by the vapors. The volume of the liquid in the pool is dependent upon the following factors:

1. The rate of flow of refluxing liquid.
2. The viscosity of the refluxing liquid.
3. The surface tension of the refluxing liquid.
4. The inclination of the column.
5. The size of the siphon tubes.
6. The rate of vapor flow, insofar as it deforms the surface of the pool.

If the volume of the liquid in the arrangement according to Fig. 1 resulting from the factors listed above is larger or smaller than desired, the volume can be adjusted by changing the inclination of the column.

The volume can also be regulated by providing a weir at the siphon inlets as shown at 46 in Figs. 5 and 8.

The term "pool" refers to any accumulation of liquid in a stage or cell of a column. It need not necessarily have a horizontal surface. On the contrary, in many cases the surface of the pool will be greatly deformed by the impact of the vapor while the still is in operation, and in extreme cases the pool may assume the shape of a cylindrical layer of liquid which covers a major part of the internal surface of the tube 14.

When steady operation has been achieved, the column is changed from total reflux by opening valve 28 to any desired extent. The top product is thereby collected in the storage tank 29. After the distillation has been completed the bottom product is allowed to collect in the kettle 16 and may be withdrawn via line 37.

Because of the arrangement described above, the pressure in the kettle differs from that at the upper end of the column only very slightly, the exact amount being, of course, dependent upon the size of the column, the number of stages used, the sizes of the orifices 21 and the rate of distillation. This pressure difference is, however, smaller than with conventional columns of comparable size and number of stages when operated at comparable rates of throughput because each of the three causes of pressure drop previously considered has been minimized. The vapors are not bubbled through successive pools of liquid, whereby the effect of the liquid head is obviated. Because of the substantially horizontal position of the column the effect of the vapor head is practically eliminated; and the vapor friction is only that due to the flow through the thimbles and orifices 21.

While a batch distillation of the type which would be used in analytical work was described above, it is understood that the column can also be applied to continuous operations, and that the charge may be introduced at any desired intermediate point in the column, in the manner described more particularly in connection with Figs. 11 to 13.

Figure 3:
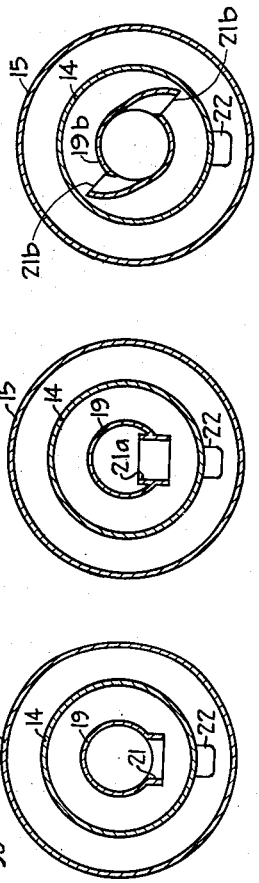

In the embodiment previously described the passage 20 and the space just to the left of the thimble serves as a disengaging space for the separation of entrained liquid from the vapor which liquid can flow back into the pool. The carry-over of entrained liquid can be further reduced by providing a trap arrangement. One example of such a trap is shown in Fig. 3, wherein the reference numbers correspond to those previously described, and the orifice 21a is formed as a tube protruding above the wall of the thimble 19.

Figure 4:
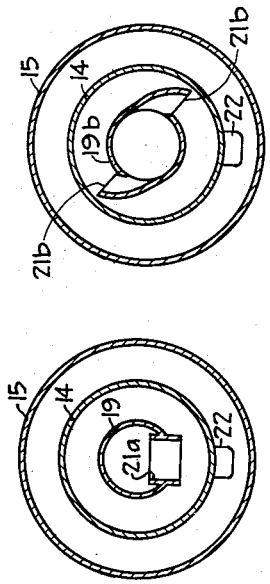
Figs. 3 and 4 are cross-sectional views, similar to Fig. 2, showing modified forms of the vapor nozzles.

In the modification shown in Fig. 4, agitation of the liquid in each pool is attained by constructing the thimble 19b with a plurality, e. g., two tangentially disposed orifices 21b which cause the vapors issuing from the thimble to whirl around the thimble, thereby sweeping across the surface of the pool and effecting intimate contact. The vapor moves in a generally circular path which is tangent to the surface of the pool.

For columns designed for larger throughputs it is desirable to make provisions to subdivide the vapor streams into smaller streams. Such arrangements are illustrated in Figs. 5 to 10, which show only short sections of the columns, it being understood that such sections are to be assembled in any desired number to form an inclined column to be used in the same manner as that described for Figs. 1 and 2.

Referring to Figs. 5 and 8, the column 14c is subdivided into stages by means of thimbles 19c in the form of cylindrical shells having closed upstream ends and being open toward the lower downstream end of the column. The thimbles are mounted in the column by means of fingers 39 cut and bent from the thimble as shown, whereby the open rim of the cylinder is notched. The annular space between the column and thimble is sealed by means of an annular disc 40, and adjacent stages are connected by siphon tubes 22c. The inlet ends of these siphon tubes extend above the bottom of the tube 14c to provide inlet weir 46; this increases the depth of the pools. The lower 120° sector of each thimble is provided with a plurality of holes 21c. In the operation of this device the liquid collects in pools to the right of each sealing ring 40 and flows through the siphon tubes 22c, as previously described. The vapor emerges through the holes 21c with turbulence, agitating the liquid in each pool with considerable violence and effecting intimate contact therewith.

In Figs. 6 and 9 the column 14d is subdivided into stages by thimbles 19d mounted by bushing 41, and the stages are interconnected for the flow of reflux liquid by siphons 22d. The thimbles have curved end closures 42 and are provided with baffles or louvers 43 mounted in the bottom of the thimble, and disposed to direct the vapor downwardly and slightly forwardly (toward the higher end of the column). Inserts 44 are mounted in the column 14d beneath the louvers, these inserts being formed to have cross-sections corresponding to shallow segments of a circle, as shown in Fig. 9, and with transverse ridges on their upper surfaces, as shown in Fig. 6, to provide a sawtoothed profile. It will be noted that the ridges are arranged to provide transverse depressions sloping gradually toward the lower end of the column but rising steeply in the other direction, whereby liquid pool will take the form of a succession of alternating deeper and shallower sections, and the liquid will cascade from one section to the next within each stage. The liquid, therefore, flows successively through shallower and deeper portions of the pool. The ridges are arranged so that the vapor passing between each pair of louvers is directed toward a different section of the pool. The method of operation of this embodiment is the same as previously described. The vapor issuing from each thimble in a plurality of streams between the louvers comes into intimate contact with the liquid in the shallow pools and while cascading over the ridges on the inserts 44.

In Figs. 7 and 10 the column 14e is subdivided into stages by thimbles 19e mounted by bushing 41e as in the foregoing embodiment, and the stages are interconnected for the flow of reflux liquid by siphons 22e. The thimbles are in the form of cylinders having closed ends toward the upper end of the column and open toward the lower end. To the right of the bushing 41e each thimble is cut longitudinally and has the wall sections bent inwardly to form deflectors or louvers 45. Vapor issuing from the thimble is thereby caused to rotate about the thimble in a manner analogous to that in the case of Fig. 4, resulting in flow across the surface of the liquid in the pool with considerable speed and effecting intimate contact with the liquid.

The invention may also be applied to vertical columns, as shown in Figs. 11 to 13, wherein 50 is the column or shell provided with a plurality of trays 51 providing separate basins for the formation of liquid pools and subdividing the column into stages. Each tray, as shown in greater detail in Figs. 12 and 13, is traversed by a riser 52 for vapor made of large cross-section to impose a minimum of friction and curved in the form of an inverted U to direct the vapor stream downwardly toward the bottom of the tray through which it passed. The outlet of the riser is constricted slightly to increase the vapor velocity and may, if desired, be provided with baffles of louvers 53 to subdivide the vapor stream and impart to it a slight horizontal velocity component across the tray. The outlet terminates about midway between adjacent trays 51. The stages are further interconnected by overflow pipes 54, of which any number may be provided, two being shown traversing each tray. The overflow pipes are positioned with their intakes spaced above the tray deck by about one-fourth of the vertical distance between trays, although this distance may be varied and shallower or deeper pools may be provided. The outlet ends of the overflow pipes extend beneath the liquid level in the tray to seal them against upward flow of vapor. In the normal operation the overflow pipes are empty down to the liquid level on the lower tray and a small stream of liquid flows along the walls; in other words, the overflow pipes do not impose a liquid head from stage to stage. It will be noted that the overflow pipes are positioned to drain off liquid at the same side of the tray as is occupied by the riser 52 which supplies vapors to the tray, one overflow pipe being on either side of the riser. This arrangement insures the flow of liquid across the tray in a direction opposite to the horizontal velocity component of the vapor, thereby promoting agitation and intimate contact.

The column is provided with the usual arrangements for supplying heat and a high vacuum and for condensing the returning reflux to the column. A typical arrangement which, however, represents only one of many possible designs, is shown in Fig. 11, wherein 55 is a reboiler supplied with steam or some other heating medium at a rate controlled by valve 56 and temperature controller 57, responsive to the temperature at the bottom of the column. The charge may be introduced via feed line 58 and valve 59, vaporized in the reboiler, and fed into the column via a vapor line 60, which should be of large diameter to minimize friction and avoid the building up of a pressure in the reboiler. The vapors are discharged against the liquid on the lowermost tray of the column through a spout 61 which may be provided with louvers such as those shown at 53 in Fig. 12. Liquid from the bottom of the column is withdrawn at 62 and flowed to the reboiler via line 63. A portion of this liquid may be drawn off as bottom product via valve 64 at a rate determined by liquid level controller 65.

Vapor from the top of the column flows through a large diameter vapor line 66 to a condenser 67 from which the condensate and uncondensed vapors are withdrawn via line 68 into vapor and liquid separator 69. A part of the liquid condensate is returned to the column as reflux via line 70, controlled by valve 71. Liquid not returned to the column is withdrawn from the process via line 72, controlled by valve 73. Uncondensible gases from the separator 69 pass through a vent cooler 74, and to a vacuum pump, not shown, via line 75. Liquid condensed in cooler 74 may be withdrawn separately from the separator 69, depending upon the nature of the materials being distilled and the desired purity.

In the operation of the column, reflux condensate collects on each tray 51 to a level determined by the overflow pipes 54, flowing downwardly from stage to stage. Vapors move upwardly through the risers 52 and are blown against the pool surfaces with sufficient velocity to agitate the liquid and create a depression in the liquid level in the area toward which the vapor stream is directed, thereby causing intimate contact between the vapor and the liquid.

It is, of course, possible to introduce the feed material at any desired point in the column. The point of introduction should, preferably, be selected to correspond to the composition of the feed material. Thus, the valve 59 may be closed and the mixture to be distilled may be introduced at 76 via valve 77.

Moreover, while I have described the application of high vacuum beyond the condenser in accordance with the usual practice, the application of a booster vacuum at one or more intermediate points, for example, in the manner described by Bogart et al. in U. S. Patent No. 2,311,180, is a possible variant of the invention.

*Example I*

To illustrate the results obtainable by the use of the instant invention, a 12-stage column of the type shown in Figs. 1 and 2 and inclined at an angle of 6° to the horizontal was constructed of glass to the following dimensions:

| | mm. |
|---|---|
| Internal diameter of column 14 | 60 |
| Internal diameter of passage 20 | 38 |
| Diameter of orifice 21 | 30 |
| Length per stage | 60 |

A mixture of 45.2 per cent of hexadecane and 54.8 per cent of octadecene-1 was heated in the kettle to a temperature of 117° C., while high vacuum was applied to the condenser by means of a rotating oil pump which lowered the pressure in the vacuum line to 0.1 mm. Hg. The column was operated first at a total reflux rate of 1.2 ml./min. After equilibrium had been established, 8.3 per cent of the overhead-condensate was withdrawn as overhead product during 20 minutes; resulting in 2 ml. of hexadecane having a purity of 98.8 per cent. The pressure at the kettle end of the column during this operation was 0.5 mm. Hg.

*Example II*

Using the column described in Example I, a mixture of 231 gms. of hexadecane and 194 gms. of octadecene was fractionally distilled at a pressure of 0.11 mm. Hg. The rate of throughput was adjusted to 125 ml./hour and the rate of take-off was held at 25 ml./hour. The distillate was collected in eleven consecutive portions which are described in the table below.

| Fraction No. | Boiling Range in °C. | Weight in gms. | Composition | |
|---|---|---|---|---|
| | | | Percent Hexadecane | Percent Octadecane |
| 1 | 70.0–71.3 | 10 | 98.3 | 1.7 |
| 2 | 71.3–71.9 | 81 | 97.4 | 2.6 |
| 3 | 71.9–72.3 | 55 | 96.5 | 3.5 |
| 4 | 72.3–72.9 | 19 | 92.2 | 7.8 |
| 5 | 72.9–74.6 | 39 | 91.5 | 8.5 |
| 6 | 74.6–85.7 | 57 | 60.4 | 39.6 |
| 7 | 85.7–86.6 | 30 | 10.3 | 89.7 |
| 8 | 86.6–87.6 | 40 | 7.5 | 92.5 |
| 9 | 87.6–89.0 | 63 | 1.0 | 99.0 |
| 10 | 89.0–89.2 | 21 | 1.0 | 99.0 |
| 11 | 89.2 | 9 | <1.0 | >99.0 |

*Example III*

Crude diallyl phthalate in which an acidic and a colored contamination were obtained were distilled through the column described in Example I, using the operating conditions described in Example II. The first 10 per cent of the distillate contained most of the acid and color and was collected separately. The subsequent portions of the distillate had an acidity of 0.04 milliequivalent per 100 grams and a color of 17 (Platinum-Cobalt scale), whereas a similar raw material after a distillation through a vacuum still of conventional design yielded a distillate having an acidity of 0.12 milliequivalent per 100 grams and a color of 50.

The method is, of course, not restricted to the separation of mixtures of the properties and types described in the examples, but is applicable in any situation wherein distillation under conditions of high vacuum are desired for any reason. The method and apparatus find particular application, among other fields, in the distillation of plasticizers, drying fatty acids and other high boiling substances.

I claim as my invention:

1. A high vacuum fractional distillation column comprising a tubular shell inclined slightly to the horizontal; a plurality of partitions within said shell subdividing said shell into a series of discrete stages, said partitions being formed as thimbles that have their peripheral portions sealed to the wall of the shell and extend from said sealed portions into the respectively higher stages to provide vapor conduits of large cross-section, each thimble having an opening above the level of the liquid pool in the said respective higher stage and directed to discharge vapor against the surface of said pool and being restricted in area to discharge said vapor at high velocity sufficient to deform the said liquid surface materially from a flat, horizontal surface for effecting intimate contact with said liquid; and liquid conduit means for flowing liquid successively from each basin to the next lower basin in the series out of contact with vapor.

2. A high vacuum fractional distillation column comprising a tubular shell; a plurality of partitions within said shell subdividing said shell into a series of discrete stages, said partitions and shell forming within each stage a basin for the collection of a pool of liquid; liquid conduit means for flowing liquid successively from each basin to the next in the series out of contact with vapor; and a vapor conduit of large cross-section for each stage except the first in the series having an intake in the respective stage and an outlet in the preceding stage above the liquid pool therein, said outlet having the axis thereof substantially vertical to discharge vapor downwardly substantially perpendicularly against the surface of the said pool and being restricted in area to discharge said vapor at high velocity sufficient to deform said liquid surface materially from a flat, horizontal surface for effecting intimate contact with said liquid.

3. The distillation apparatus according to claim 2 wherein at least one basin has spaced liquid supply and discharge points for respectively receiving liquid from a preceding stage and discharging liquid to a subsequent stage, at least part of the basin being located between said spaced points; the floor of said basin is stepped in the direction of liquid flow between said spaced points to divide the pool thereon into a plurality of sections that are alternately relatively shallower and deeper; and the outlet of the vapor conduit comprises a plurality of orifices arranged to direct separate vapor streams toward different sections of the pool.

4. A high vacuum fractional distillation column comprising a tubular shell inclined slightly to the horizontal; a plurality of partitions within said shell subdividing said shell into a series of discrete stages, said partitions and shell forming within each stage a basin for the collection of a pool of liquid; liquid conduits having downflow intakes for draining liquid from each pool to a predetermined shallow level and transferring liquid by gravity flow and out of contact with vapor to the next lower basin in the series, the difference in elevation between the first and last stages of the series being not substantially greater than that required to permit gravity flow between stages; and a vapor conduit of large cross-section for each stage except the first in the series having an intake in the respective stage and an outlet in the preceding stage above the liquid pool therein, said outlet being directed to discharge vapor against the surface of the said pool and being restricted in area to discharge said vapor at high velocity sufficient to deform said liquid surface materially from a flat, horizontal surface for effecting intimate contact with said liquid.

5. In a high vacuum fractional distillation method, the steps of introducing a mixture to be separated into a distillation zone having a series of discrete, confined contact stages and maintained at high vacuum, wherein the vapors and reflux liquid containing constituents of said mixture are flowed countercurrently to each other; vaporizing liquid at a first end of the distillation zone; condensing vapor at the second end of said distillation zone to produce a condensate; flowing at least a portion of said condensate as reflux successively through said stages toward said first end; forming a shallow pool of reflux liquid within each stage; withdrawing vapor from above each pool and transferring the withdrawn vapor to a stage toward the said second end without contiguous passage of the vapor through said liquid pools; agitating the liquid in each of said pools by directing said withdrawn and transferred vapor as one or more vapor streams having a total cross-sectional area materially less than the horizontal cross-sectional area of the stage containing the pool to be agitated downwardly against and substantially perpendicularly to the surface of the said pool, said streams having high velocities sufficient to deform the said surfaces materially from flat, horizontal surfaces and thereby to effect intimate contact with the liquids of the respective pools; and transferring the liquid reflux progressively from pool to pool out of contact with the vapors, said reflux liquid being supplied to and withdrawn from at least one stage at spaced points thereof, at least the major part of the pool in said one stage being located between the said spaced points and comprising alternate sections that are relatively deeper and shallower along the path of liquid travel between said spaced points and the vapor within said one stage being subdivided into a plurality of streams directed against different sections of the pool.

6. A high vacuum fractional distillation column comprising a tubular shell inclined slightly to the horizontal; a plurality of transverse partitions within said shell subdividing said shell into a series of discrete stages, said partitions and shell forming within each stage a basin for the collection of a pool of liquid; liquid conduit means for draining liquid from each basin to a predetermined shallow level therein and transferring the liquid out of contact with vapor to a subsequent stage of the series; and a vapor conduit located within each stage above the level of the liquid pool therein and having a cross-sectional area that is large in relation to the cross-sectional area of the shell, each vapor conduit having one or more restricted outlets within the respective stage disposed above the pool of liquid therein and directed to discharge vapor against the surface of the pool at high velocity to deform the surface of said pool from a flat, horizontal surface, each vapor conduit being in vapor-receiving communication with the space above the liquid pool in the subsequent stage through an opening in the adjoining partition.

7. The distillation apparatus according to claim 6 wherein the outlets are directed downwardly substantially perpendicularly to the surfaces of said pools.

8. The distillation apparatus according to claim 6 wherein the shell and vapor conduits are substantially concentric to leave an annular vapor space between the shell and vapor conduit, and outlets of the vapor conduit are directed substantially tangentially to the said annular space to discharge vapor into said space with a swirling movement tangentially to the surfaces of the pools.

9. The distillation apparatus according to claim 6 wherein at least one vapor conduit comprises a duct above the liquid pool of the respective stage and the outlet thereof is directed substantially along a circle that is tangent to the said surface and has an axis that is substantially parallel to said surface.

10. The distillation apparatus according to claim 6 wherein the outlet of at least one vapor conduit comprises a plurality of louvers disposed to form a plurality of louvers.

HANS DANNENBERG.

References Cited in the file of this patent

UNITED STATES PATENTS

| Number | Name | Date |
|---|---|---|
| 344,322 | Lunge | June 22, 1886 |
| 498,085 | Schalitz | May 23, 1893 |
| 1,366,956 | Schneible | Feb. 1, 1921 |
| 2,176,498 | Hickman | Oct. 17, 1939 |
| 2,311,180 | Bogart et al. | Feb. 16, 1943 |
| 2,406,421 | Wollner | Aug. 27, 1946 |
| 2,446,997 | Brewer et al. | Aug. 17, 1948 |

FOREIGN PATENTS

| Number | Country | Date |
|---|---|---|
| 200,980 | Germany | Aug. 5, 1908 |
| 398,847 | France | June 15, 1909 |
| 75,246 | Austria | Jan. 25, 1919 |
| 559,172 | France | Nov. 28, 1922 |
| 495,530 | Germany | Apr. 9, 1930 |
| 38,136 | Norway | Oct. 29, 1923 |

OTHER REFERENCES

Hickman: "High Vacuum Distillation," Ind. and Eng. Chem., vol. 40, No. 1 (1948), by 16, 17, 18.